April 25, 1933.                A. GAZDA                 1,905,582
                        PISTON WITH COOLING EFFECT
                           Filed April 23, 1929

Patented Apr. 25, 1933

1,905,582

UNITED STATES PATENT OFFICE

ANTON GAZDA, OF VIENNA, AUSTRIA

PISTON WITH COOLING EFFECT

Application filed April 23, 1929, Serial No. 357,472, and in Austria April 23, 1928.

This invention relates to a piston with cooling effect, particularly for internal combustion engines, of the kind in which the tightly closed hollow space of the piston is wholly or partly filled with a readily movable substance which transmits the heat from the hot places to the cooler places of the piston. The known filling substances, for instance water, are not suited for this purpose because at high temperatures of the piston the pressure of the generated steam is a danger to the piston. It is also known to use mercury as filling substance which however is not suited in view of its considerable weight.

The piston according to the present invention is provided with an insertion mounted in the interior of the body portion of the piston in such a manner that a tightly closed hollow space is formed (which is bounded by the insertion and the interior of the said body portions), said hollow space containing a small quantity of a heat-conducting substance, more particularly liquefiable salts, having a boiling temperature preferably above the highest temperature occuring in the engine. The heat-conducting substances employed are preferably salts of potassium and sodium, but a powdered light metal may also be employed.

Figure 1:
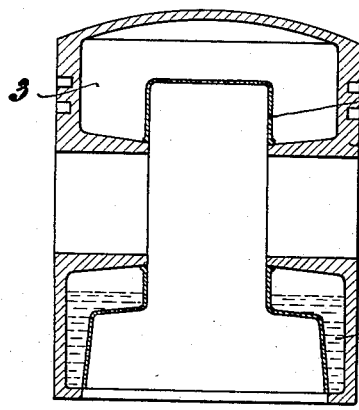
Figure 2:
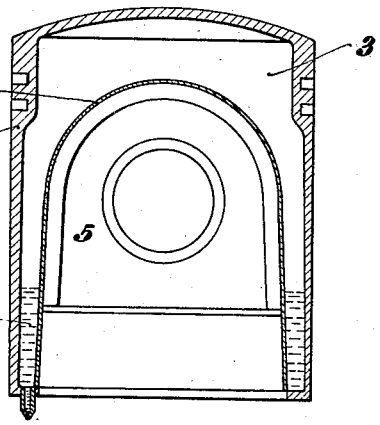
Figure 3:
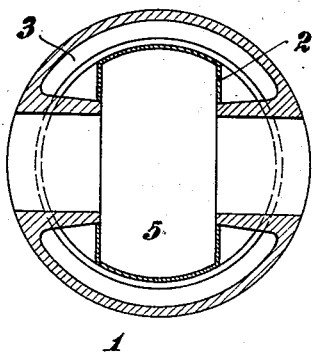

One mode of carrying out the present invention is illustrated by way of example in Figs. 1 to 3 of the accompanying drawing in the three principal sections.

In the body 1 of the piston is mounted an insertion 2 in such a manner, that it forms a hollow space 3 in the piston which is tightly closed at all sides and within which remains the space 5 for the movement of the connecting rod. The piston pin (not illustrated) of the connecting rod is tightly passed through the walls of the insertion 2. A small part of the hollow space or compartment 3 is filled with the heat-transmission substance 4, which owing to the stroke of piston is vigorously thrown into all parts of the compartment and is heated by the hot places of the piston and transmits the heat to the cooler places thereof.

Cooling ribs, enlarging the surface, may be arranged in the interior of the hollow space in order to enlarge the surfaces giving up or receiving the heat.

I claim:—

1. A piston comprising a body portion, an insertion tightly fitted in said body portion providing a closed hollow space bounded by the interior surface of the body portion and the adjacent surface of the insertion, and a small quantity of liquefiable salt in said hollow space and having a boiling temperature above the highest temperature occuring in the engine.

2. A piston as claimed in claim 1, characterized in that said insertion is concaved to provide a space for accommodating movement of the piston rod.

In testimony whereof I affix my signature.

ANTON GAZDA.